(12) United States Patent
Zhang et al.

(10) Patent No.: US 10,433,665 B2
(45) Date of Patent: Oct. 8, 2019

(54) VALVE ASSEMBLY FOR LEAK RESISTANT STRAW CUP

(71) Applicant: HANDI-CRAFT COMPANY, St. Louis, MO (US)

(72) Inventors: Xiangwen Zhang, Ellisville, MO (US); Douglas Hanneken, St. Louis, MO (US)

(73) Assignee: Handi-Craft Company, St. Louis, MO (US)

( * ) Notice: Subject to any disclaimer, the term of this patent is extended or adjusted under 35 U.S.C. 154(b) by 305 days.

(21) Appl. No.: 15/414,373

(22) Filed: Jan. 24, 2017

(65) Prior Publication Data

US 2017/0208974 A1    Jul. 27, 2017

Related U.S. Application Data

(60) Provisional application No. 62/286,581, filed on Jan. 25, 2017.

(51) Int. Cl.
| | |
|---|---|
| *A47G 19/22* | (2006.01) |
| *B65D 47/06* | (2006.01) |
| *F16K 7/17* | (2006.01) |
| *F16K 31/126* | (2006.01) |
| *B65D 47/08* | (2006.01) |
| *B65D 47/32* | (2006.01) |
| *A47G 21/18* | (2006.01) |

(52) U.S. Cl.
CPC ......... *A47G 19/2272* (2013.01); *A47G 21/18* (2013.01); *B65D 47/066* (2013.01); *B65D 47/0857* (2013.01); *B65D 47/32* (2013.01); *F16K 7/17* (2013.01); *F16K 31/1266* (2013.01)

(58) Field of Classification Search
CPC ............ A47G 2019/2277; B65D 47/32; B65D 47/0857; B65D 47/066; F16K 31/1266; F16K 7/17
See application file for complete search history.

(56) References Cited

U.S. PATENT DOCUMENTS

| | | | |
|---|---|---|---|
| 4,196,747 | A | 4/1980 | Quigley et al. |
| 6,050,444 | A | 4/2000 | Sugg |
| 6,325,236 | B1 | 12/2001 | Wong |
| 6,568,557 | B2 | 5/2003 | Fusco et al. |
| 6,732,882 | B2 | 5/2004 | Belcastro |
| 6,758,364 | B1 | 7/2004 | Roehrig |

(Continued)

FOREIGN PATENT DOCUMENTS

| | | |
|---|---|---|
| WO | 2001070079 A2 | 9/2001 |
| WO | 2004101382 A1 | 11/2004 |
| WO | 2014117209 A1 | 8/2014 |

*Primary Examiner* — Andrew T Kirsch
*Assistant Examiner* — Don M Anderson
(74) *Attorney, Agent, or Firm* — Armstrong Teasdale LLP

(57) ABSTRACT

A valve assembly for a leak resistance drinking cup is selectively configurable between a sealed position and an unsealed position. The valve assembly includes a plug having an inner surface, an outer surface, and an opening extending through the plug from the outer surface to the inner surface. An amount of vacuum acting on the outer surface of the plug needed to move the valve assembly from the sealed position to the unsealed position is less than the amount of internal pressure acting on the inner surface of the plug needed to move the valve assembly from the sealed position to the unsealed position.

18 Claims, 14 Drawing Sheets

(56) References Cited

U.S. PATENT DOCUMENTS

| | | |
|---|---|---|
| 7,070,065 B2 | 7/2006 | Wong et al. |
| 7,556,172 B2 | 7/2009 | Lane |
| 7,575,126 B2 | 8/2009 | Kemper |
| 8,091,730 B2 | 1/2012 | Keefe et al. |
| 8,186,537 B2 | 5/2012 | Rosnak et al. |
| 8,342,422 B2 | 1/2013 | Claessens |
| 8,453,870 B2 | 6/2013 | Berg |
| 8,763,827 B2 | 7/2014 | Cohn |
| 8,807,386 B2 | 8/2014 | Lam |
| 2002/0179615 A1* | 12/2002 | Hakim ............... A47G 19/2272 220/714 |
| 2005/0205589 A1 | 9/2005 | Davis et al. |
| 2006/0108373 A1 | 5/2006 | Cheng |
| 2008/0073363 A1 | 3/2008 | Higgins |
| 2012/0012597 A1 | 1/2012 | Rossitto |
| 2012/0055942 A1 | 3/2012 | Claessens |
| 2015/0020906 A1 | 1/2015 | Tollman |
| 2015/0208838 A1 | 7/2015 | Parker et al. |

* cited by examiner

VALVE ASSEMBLY FOR LEAK RESISTANT STRAW CUP

CROSS REFERENCE TO RELATED APPLICATIONS

This application claims the benefit of U.S. Provisional Application No. 62/286,581 Filed Jan. 25, 2016, which is incorporated herein in its entirety.

FIELD

The field of this disclosure relates generally to leak resistant drinking cups and more particularly to a valve assembly for a leak resistant straw cup wherein the valve assembly is moveable between a sealed position and an unsealed position.

BACKGROUND

Leak resistant drinking cups are often adapted for use by young children (e.g., infants, toddlers, preschoolers) or people on the go (e.g., commuters, students, hikers, joggers). Usually, the cup includes a container defining an interior space for receiving and holding liquids therein. The container typically includes an open top, and the cup often includes a relatively rigid cover for closing the open top of the container. The cover can be releasably attached (e.g., snapped or screwed on) to the container. These types of drinking cups are often configured so that when they are turned over, liquid inside the cup is inhibited from spilling out of the cup by a valve or valve assembly.

The valve or valve assembly is typically disposed between the cover and the container and can be configured from a sealed configuration for inhibiting liquid from passing out of the drinking cup to an unsealed configuration for allowing liquid to pass out of the cup for drinking. Most commonly, the valve is actuated by suction (i.e., vacuum, negative pressure) applied by the user to the interior of the cup by sucking on a part of the drinking cup (e.g., a spout, a straw). The applied vacuum pressure causes the valve to move or otherwise deform in such a way that a path past the valve is created so liquid can flow out of the cup. It is possible that the valve might be actuated in other ways, such as a purely mechanical actuation. But for young children, vacuum pressure actuation is often most preferable because the only time the valve is open is when the child is in the act of taking a drink.

Vacuum actuated drinking cups of the type just described must balance the need to assure positive sealing with the need to make the cup easy to use. A strong seal by the valve requires greater vacuum to open, making it difficult for the user to use. A valve having a seal that requires a lower vacuum to open may not seal sufficiently tight to prevent at least some liquid flowing past it, especially when dropped, swung, shaken, or impacted. As a result, valves having low vacuum actuated seals are often more prone to leak. Moreover, typical valves or valve assemblies include slits (or cuts) in the valve or valve assembly that allow liquid to flow through the valve or valve assembly during use of the cup. However, these slits often provide a pathway for liquid to potentially leak from the cup.

Frequently, conventional valves are relatively small and, as a result, often require a substantial vacuum to actuate because the pressure acts on only a relatively small area of the valve. In other words, the user has to suck with significant effort to get the valve to open and obtain a drink, which makes the cup less desirable to the child.

Often, the valve or valve assembly can be disassembled from the cover for cleaning. Some valves and valve assemblies are difficult to detach and reassemble as they require precise alignment or orientation of relatively small parts or parts with small tolerances. Moreover, small valves or pieces of a valve assembly may be easily lost and are often difficult to handle.

There remains a need for a valve assembly and a leak resistant straw cup with a valve assembly that effectively inhibits liquid from leaking from the cup but can be readily actuated when subjected to vacuum applied by a user.

BRIEF DESCRIPTION

In one aspect, a valve assembly for a leak resistance drinking cup is selectively configurable between a sealed position and an unsealed position. The valve assembly generally comprises a plug having an inner surface, an outer surface, and an opening extending through the plug from the outer surface to the inner surface. An amount of vacuum (negative pressure) acting on the outer surface of the plug needed to move the valve assembly from the sealed position to the unsealed position is of less magnitude than the amount of internal positive pressure acting on the inner surface of the plug needed to move the valve assembly from the sealed position to the unsealed position.

In another aspect, a valve assembly for a leak resistance drinking cup is selectively configurable between a sealed position and an unsealed position. An amount of vacuum needed to move the valve assembly between the sealed and unsealed position is less than 5 inches of mercury and an amount of positive pressure needed to move the valve assembly between the sealed and unsealed position is greater than 3 inches of mercury.

In yet another aspect, a valve assembly for a leak resistant drinking cup generally comprises a plug having an inner surface, an outer surface, and an opening extending through the plug from the outer surface to the inner surface. The inner surface of the plug includes an angled surface portion and an annular surface portion circumscribing the opening. The annular surface portion is adapted to form a seal with a component of the leak resistant drinking cup.

BRIEF DESCRIPTION OF THE DRAWINGS

Corresponding reference characters indicate corresponding parts throughout the several views of the drawings.

DETAILED DESCRIPTION OF THE DRAWINGS

Figure 1:
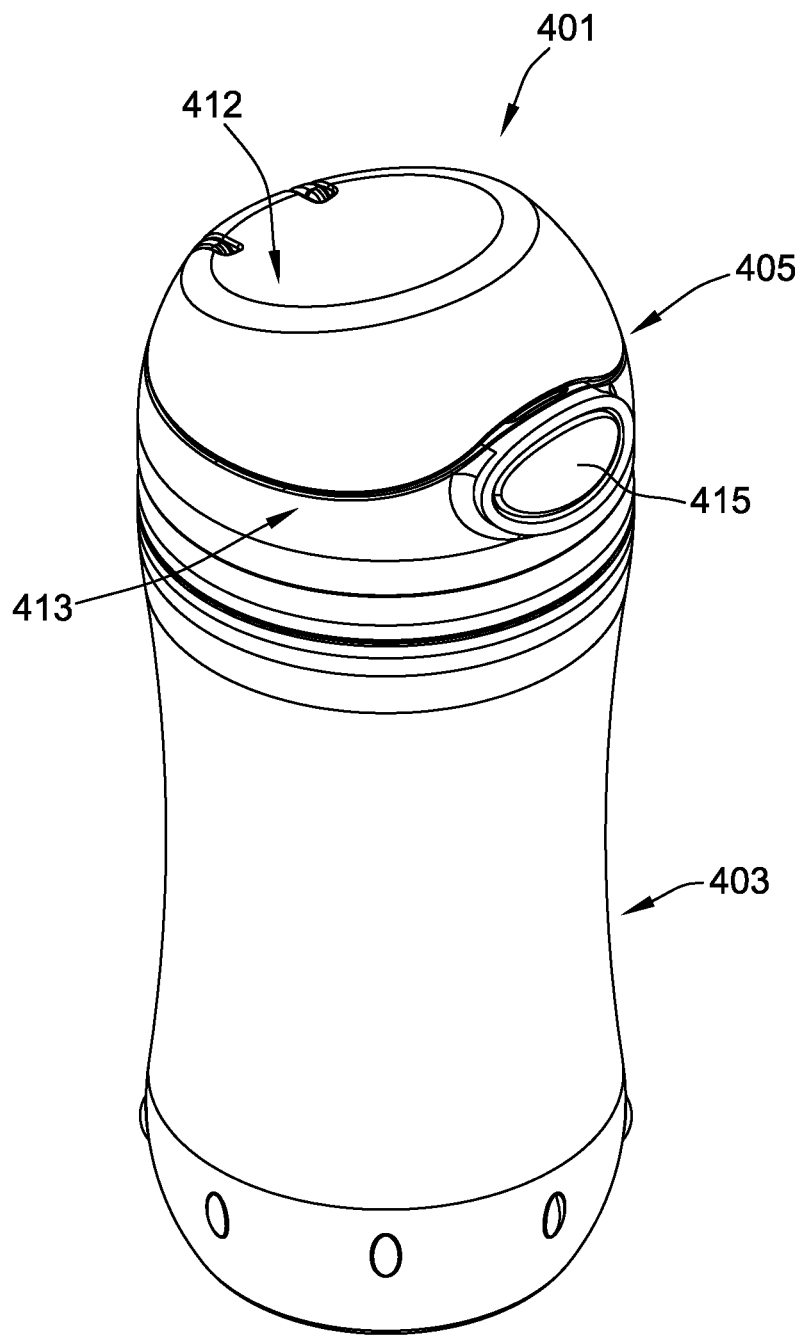
FIG. 1 is a perspective of one suitable embodiment of a leak resistant drinking cup of the present disclosure in the form of a straw cup having a container, a lid assembly coupled to the container, and a straw assembly coupled to the lid assembly.
Figure 2:
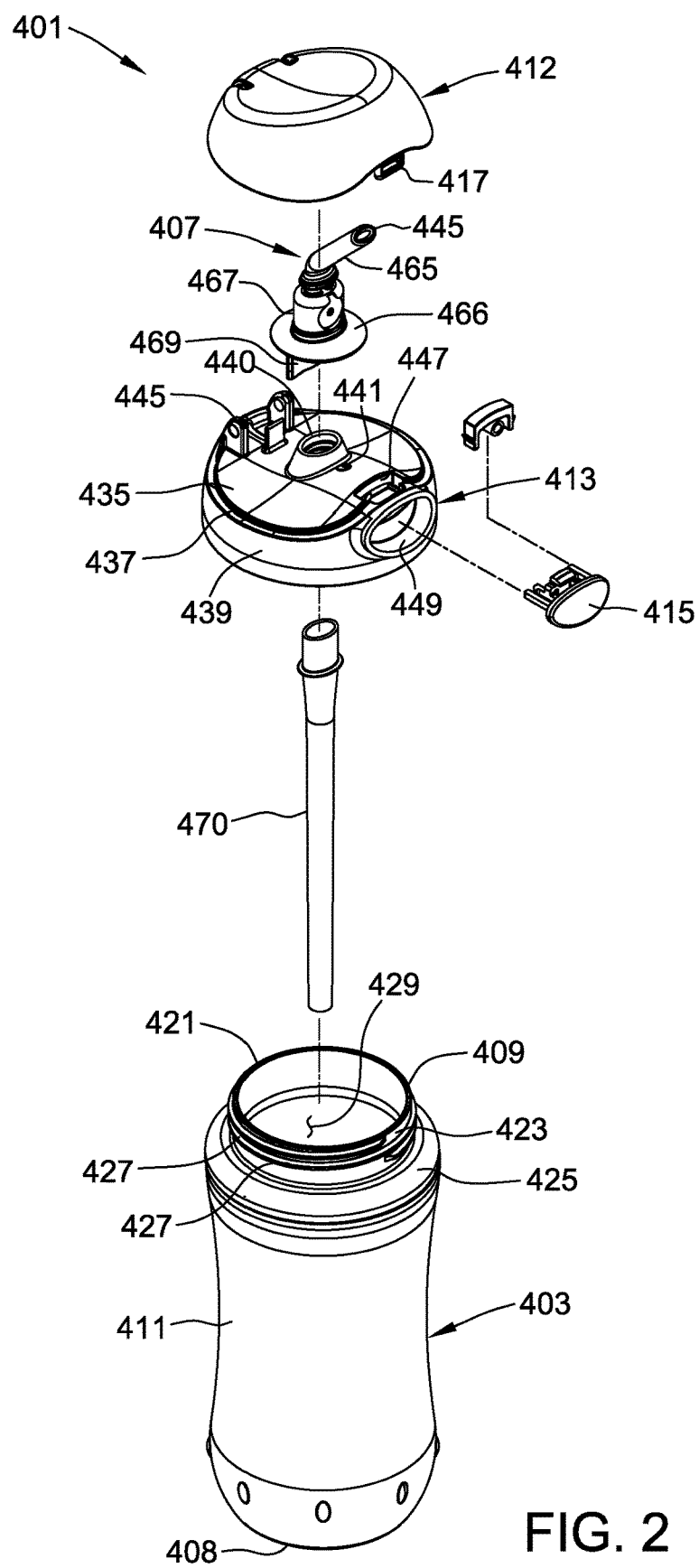
FIG. 2 is an exploded perspective of the straw cup of FIG. 1.
Figure 10:
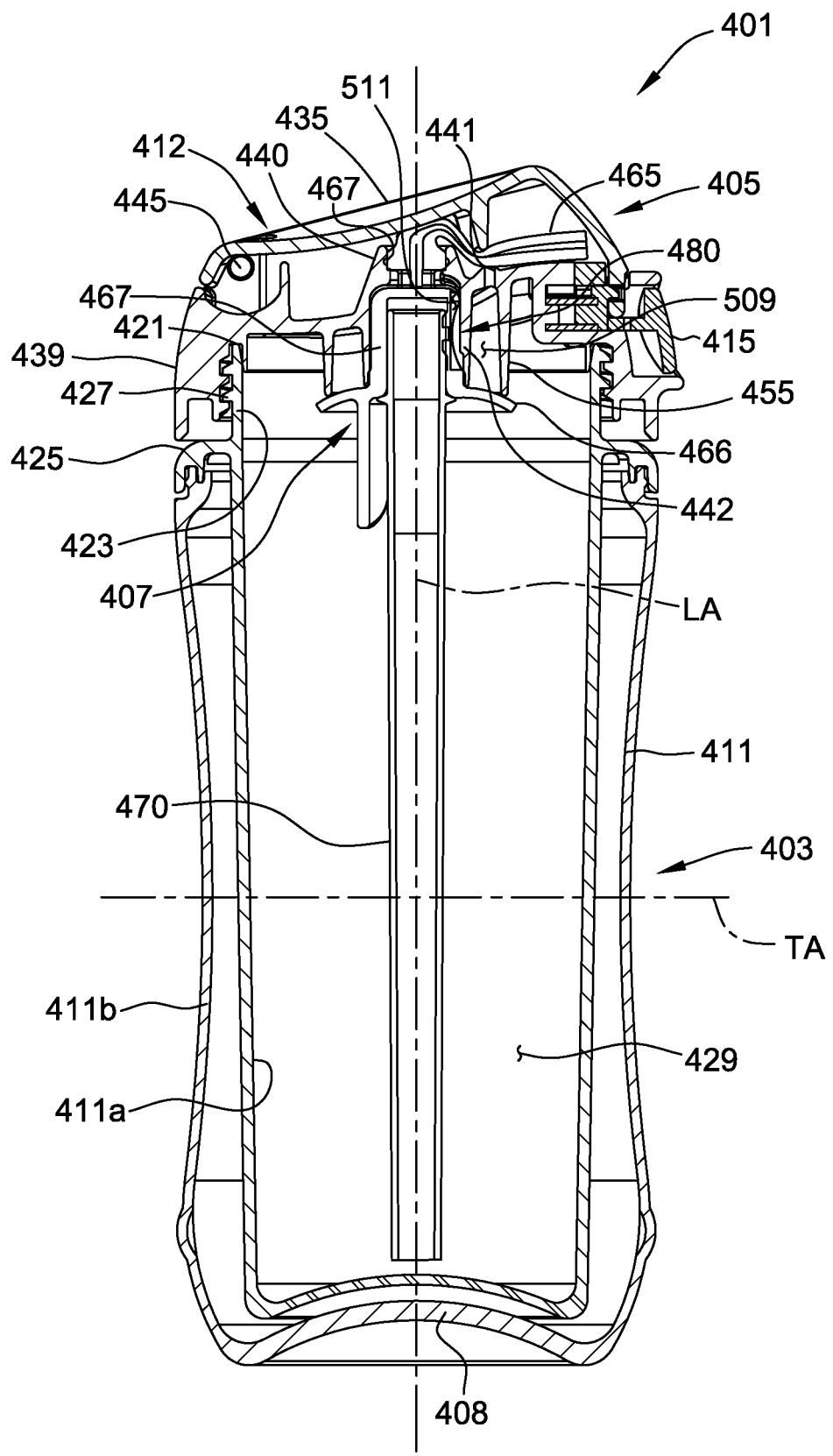
FIG. 10 is a longitudinal cross-section of the cup illustrated in FIG. 1.

Referring now to the drawings and in particular to FIGS. 1, 2, 3 and 10, a leak resistant drinking cup in the form of a straw cup, generally indicated at 401, includes a container, which is generally indicated at 403, a lid assembly, which is generally indicated at 405, and a straw assembly, which is generally indicated at 407. The illustrated container 403 is generally cylindrical and symmetric about a central or longitudinal axis LA of the cup 401. The longitudinal axis LA and a transverse axis TA of the cup 401 are identified in FIG. 10. As seen in FIGS. 2 and 10, the container 403 has a closed bottom 408, an open top 409, and a generally cylindrical side wall 411 extending between the closed bottom and the open top. The cylindrical side wall 411 of the illustrated container 403 is concaved to facilitate grasping of the container and thereby the cup 401. It is understood, however, that the side wall 411 can be convex or generally straight. The side wall 411, as seen in FIG. 2, includes a circular upper edge 421, an attachment collar 423 disposed beneath and adjacent to the upper edge, and a shoulder 425 disposed below the attachment collar. The attachment collar 423, as seen in FIG. 2, has external threads 427 thereon.

The illustrated container 403 has a liquid chamber 429 adapted to hold a quantity of liquid for consumption by a user, such as a small child. More specifically, the illustrated container 403 is adapted to hold approximately 10 ounces of liquid. It is to be understood, however, that the container 403 can be sized to hold other quantities of liquid (e.g., 6 ounces, 9 ounces, 12 ounces, 20 ounces, etc.). For example, the container 403 can be adapted for older children or adults and hold larger quantities of liquid. It is also understood that the container 403 can have a different configuration than the one illustrated herein, such as a sports bottle, a drink tumbler, a commuter cup, etc. without departing from some aspects of the disclosure.

The container 403 can be made of any suitable material such as, without limitation, polypropylene, aluminum, or stainless steel. The container 403 can also be made in any desired color or colors, and may be transparent, translucent, opaque, or combinations thereof. The container 403 can be rigid, as illustrated in the accompanying drawings, or non-rigid. It is further understood that the container 403 can be insulated or non-insulated. The container 403 illustrated in FIG. 10, for example, is insulated having an inner container wall 411a and an outer container wall 411b that is spaced from the inner container wall. In other words, the container 403 is double walled for insulation purposes as is known in the art. It is contemplated that the container 403 can comprise a single, non-insulated wall.

The lid assembly 405 of the cup 401 is adapted for removable attachment to the container 403 for selectively closing the open top 409 of the container (FIG. 2). The illustrated lid assembly 405 comprises a cover (or cap) 412 and a closure member 413 (FIGS. 1 and 2). Both the cover 412 and the closure member 413 are indicated generally by their respective reference numbers. The cover 412 and the closure member 413 can be made of any suitable material. In one embodiment, the cover 412 and the closure member 413, for example, can be made of polypropylene. The cover 412 and the closure member 413 can be made in any desired color or colors, and may be transparent, translucent, or opaque.

Figure 11:
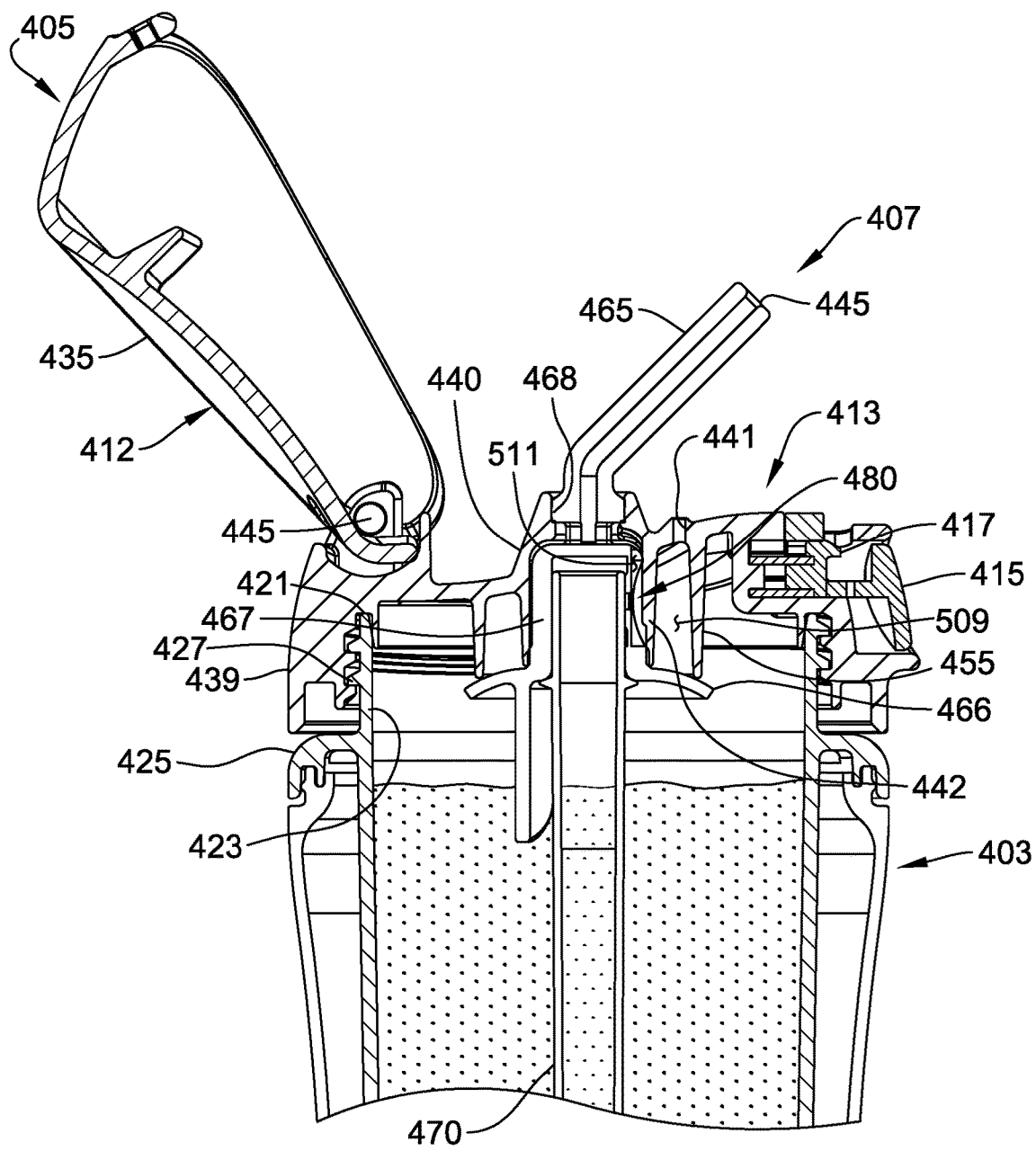
FIG. 11 is a fragmented, enlarged longitudinal cross-section of the leak resistant drinking cup, the valve assembly being in the closed, sealed configuration thereby inhibiting liquid from exiting the cup.
Figure 12:
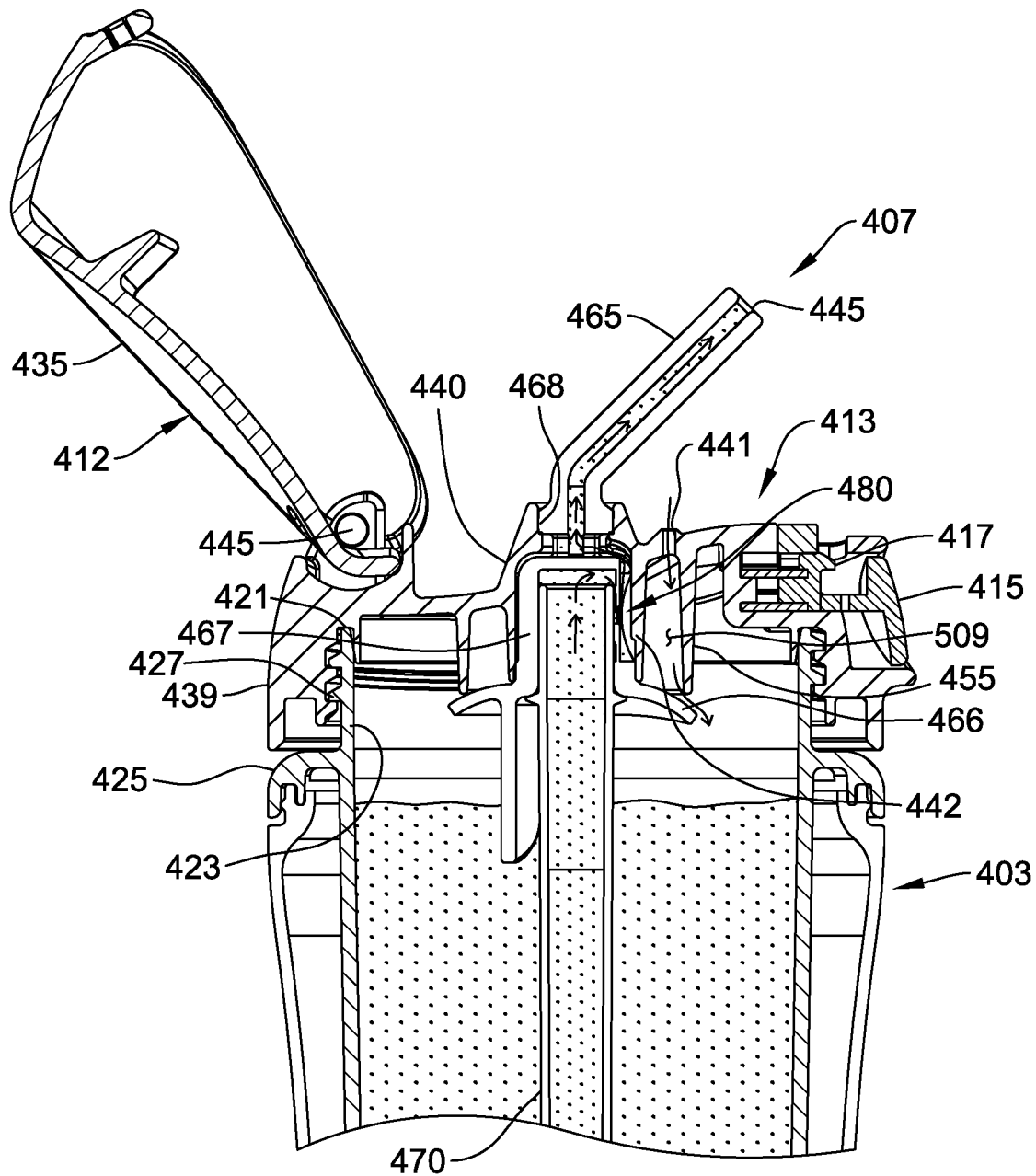
FIG. 12 is a fragmented, enlarged longitudinal cross-section similar to FIG. 11 but showing the valve assembly in an opened, unsealed configuration thereby allowing liquid to exit the cup.

In the illustrated embodiment, the cover 412 is hingedly connected to the closure member 413 and is selectively pivotable between a closed position (FIGS. 1 and 10) and an opened position (FIGS. 11 and 12). In one suitable embodiment, the cover 412, when in the closed position, is biased toward the opened position, such as by a spring. In the illustrated embodiment, a push button actuator 415 cooperates with a latch 417 of the cover 412 to hold the cover in the closed position against the bias. Actuation of the actuator 415 (i.e., pushing the button) releases the latch 417 from the actuator 415 thereby allowing the bias to pivot the cover 412 from the closed position to the opened position. The cover 412 can be selectively closed (i.e., moved from the opened position to the closed position) by manually pivoting the cover from the opened position to the closed position so that the latch 417 of the cover 412 is captured by the actuator 415. It is contemplated that in other suitable embodiments the cover 412 can be omitted or be fully removable from the closure member 413.

Figure 3:
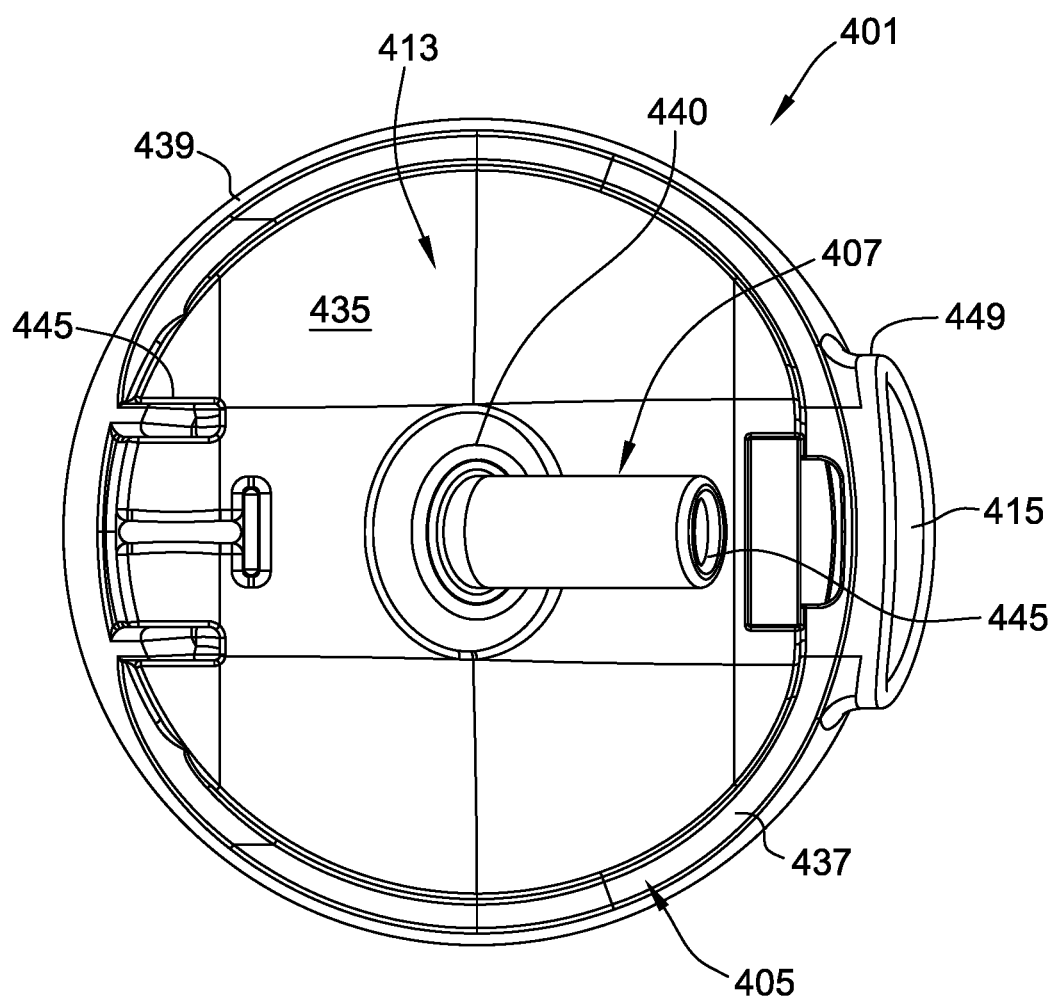
FIG. 3 is a top view of the straw cup with a cover of the lid assembly removed.
Figure 4:
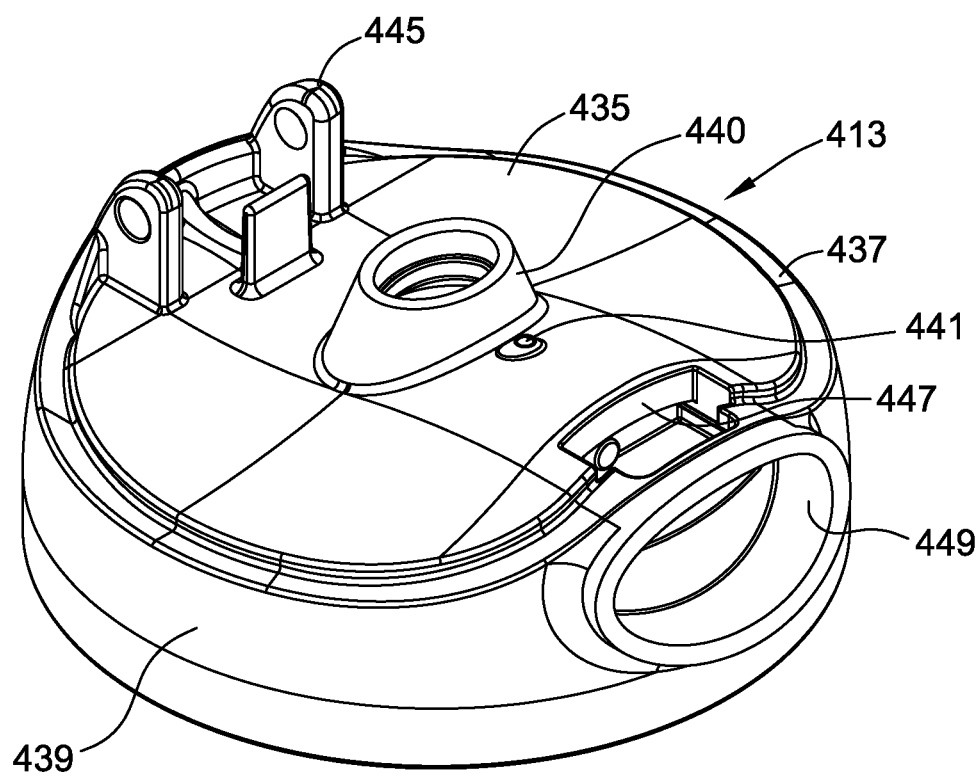
FIG. 4 is a perspective of a closure member of the lid assembly.
Figure 5:
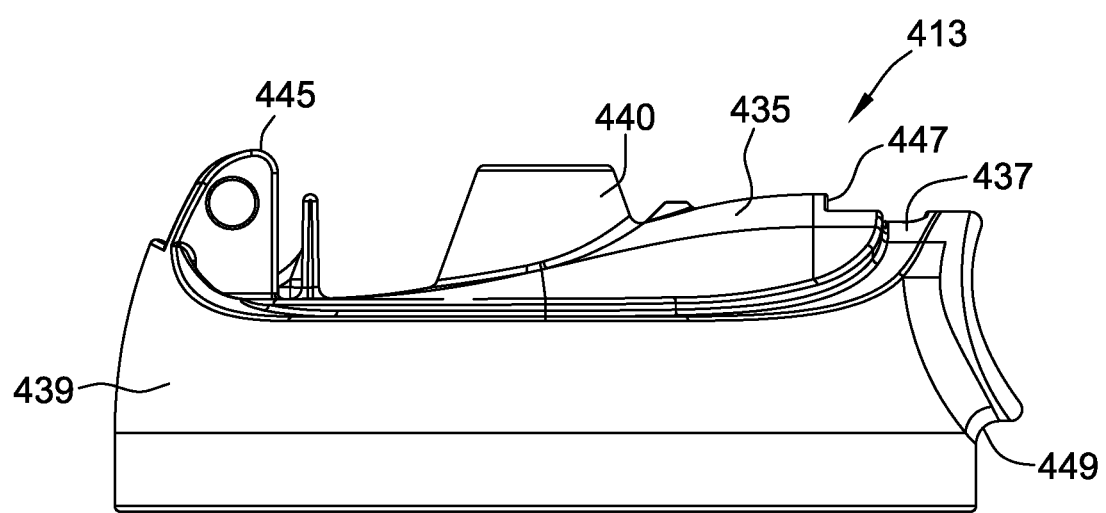
FIG. 5 is a side elevation of the closure member.
Figure 6:
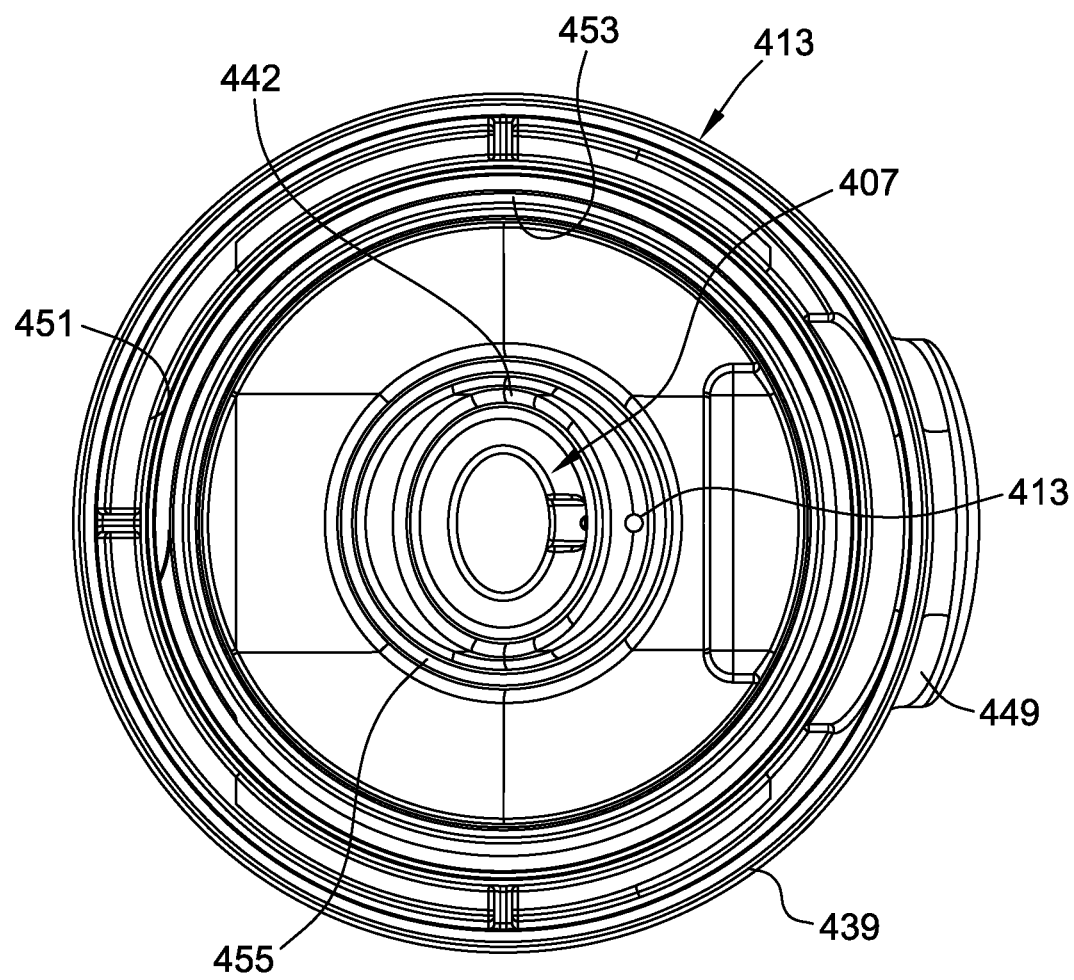
FIG. 6 is a bottom view of the closure member.

With reference now to FIGS. 2-6, the closure member 413 of the lid assembly 405 comprises a contoured upper portion 435, an annular shoulder 437 circumscribing and stepped down from the upper portion, and a peripheral skirt 439 depending downward from the annular shoulder. The closure member 413 includes an upward extending elliptical socket 440 (e.g., FIG. 4) and a downward extending elliptical socket 442 (e.g., FIG. 6) that cooperatively extents through the center of the upper portion 435 for allowing at least a portion of the straw assembly 407 to pass through the closure member 413 (FIGS. 4 and 6). A relatively small, circular vent aperture 441, which can be seen in FIGS. 4 and 6, is located adjacent the upward and downward extending elliptical sockets 440, 442. The vent aperture 441 allows air to pass through the closure member 413 when the closure member is attached to the container 403.

As best seen in FIGS. 4 and 5, the closure member 413 further comprises a hinge mount 445 for facilitating the hinged connection between the closure member and the cover 412 and a generally rectangular opening 447. With reference to FIGS. 2 and 3, the skirt 439 of the closure member 413 includes an elliptical opening 449 for receiving the actuator 415. The opening 449 in the skirt 439 is located adjacent the opening 447 in the closure member 413 so that the latch 417 can pass through the closure member 413 to the actuator 415, which is receiving in the opening 449 in the skirt 439.

As illustrated in FIG. 6, the closure member 413 has an inner socket 451 defined by the peripheral skirt 439. The inner socket 451 includes internal threads 453 (FIG. 6) for releasably mating with external threads 427 of the container 403 (FIG. 2). Thus, the closure member 413 can be selectively attached and detached from the container 403 via the threaded connection between the internal threads 453 of the inner socket 451 and the external threads 427 of the container 403. It is understood, however, that the closure member 413 can be selectively attached and detached from the container 403 using any suitable connection (e.g., snap-fit). The closure member 413, as illustrated in FIGS. 6 and 10, also includes an interior socket 455 extending downward from the upper portion 435 and circumscribing the downward extending elliptical socket 442 such that the vent aperture 441 is disposed between the interior socket and the downward extending elliptical socket. In the illustrated embodiment, the interior socket 455 is generally circular. However, the interior socket 455 can have any suitable size and shape (e.g., elliptical).

Figure 7:
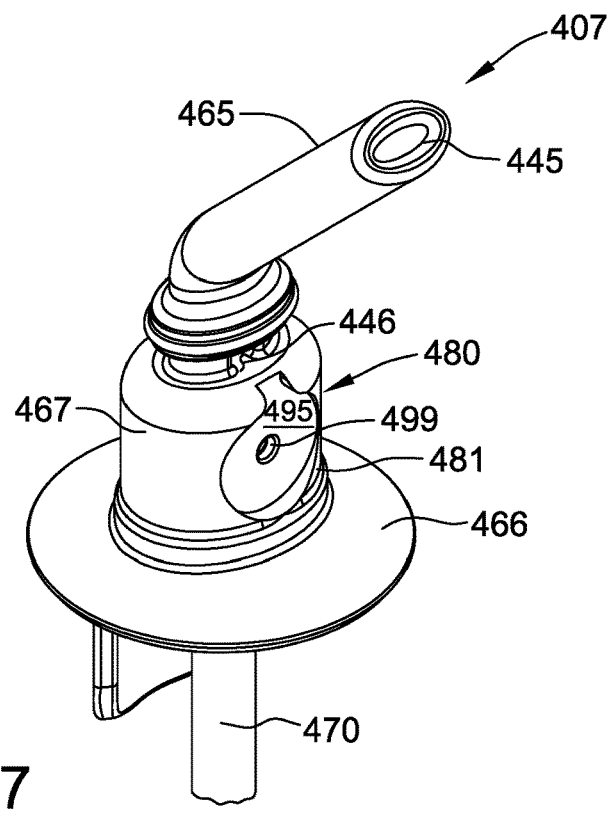
FIG. 7 is a fragmented perspective of the straw assembly removed from the straw cup.
Figure 8:
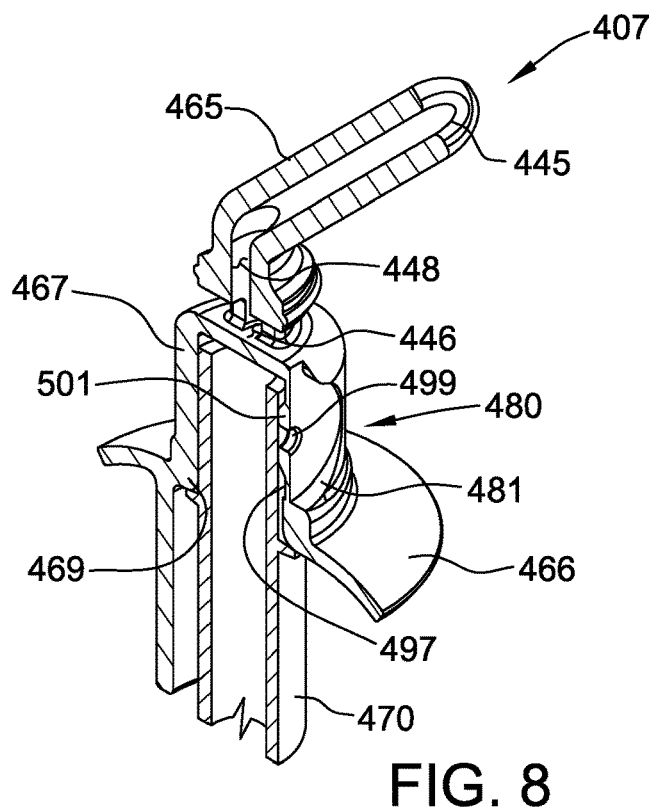
FIG. 8 is a fragmented cross-section of the straw assembly of FIG. 7.
Figure 9:
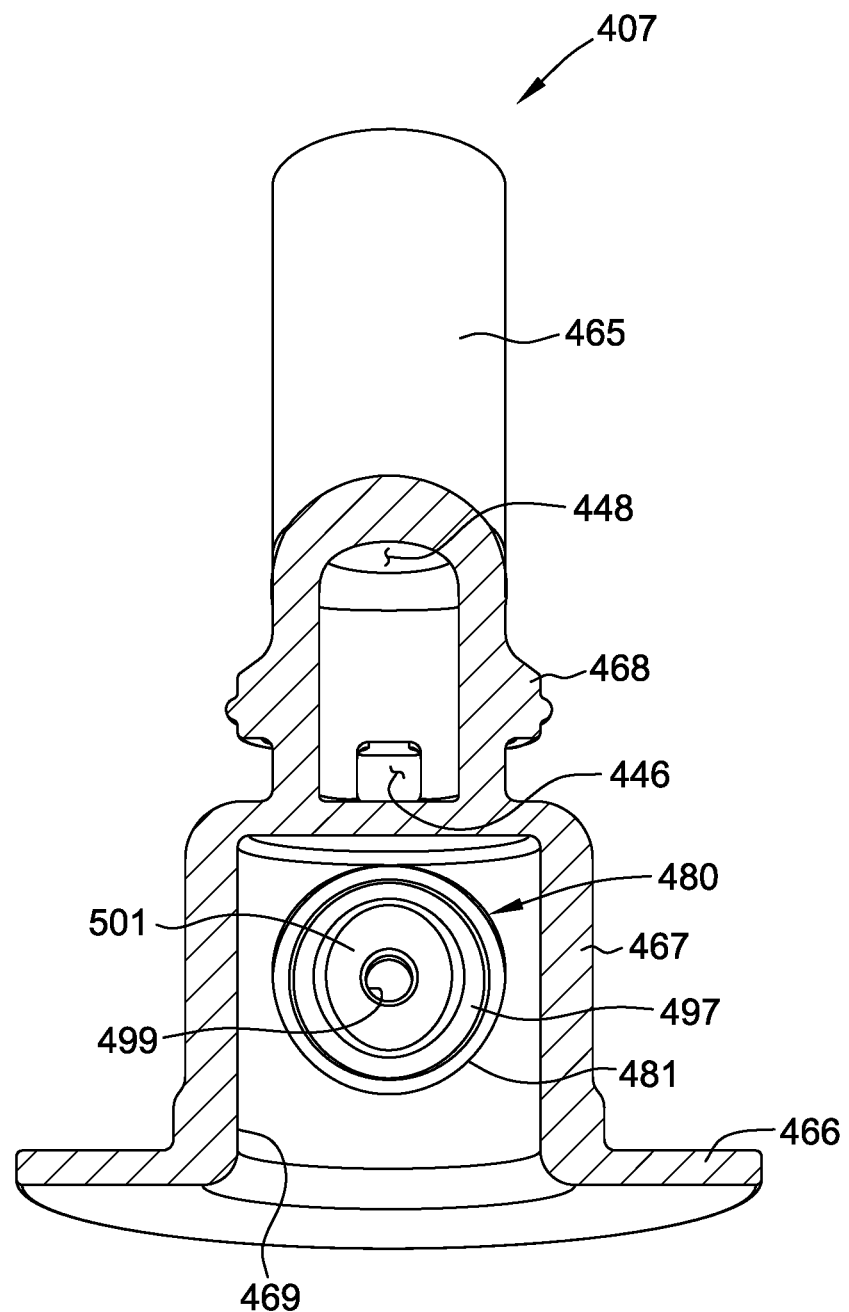
FIG. 9 is a cross-section of the straw assembly of FIG. 7 with a straw extension removed from the straw assembly.

As illustrated in FIGS. 2, 7, and 8, the straw assembly 407 is elongate and includes an upper tubular portion 465 suitable for being partially received in the child's (or broadly, the user's) mouth for drawing liquid from the container 403. With reference now to FIGS. 7-9, the straw assembly 407 further includes an upper mounting member 467, a generally ring-shaped diaphragm 466 disposed below the upper mounting member, and an internal mounting member 469. The upper mounting member 467 is sized and shaped for being received in and thereby captured by the downward extending elliptical socket 442 in the closure member 413. The internal mounting member 469, which can be seen in FIG. 8 and is defined by the inner surface, is adapted for selectively receiving via a friction fit a straw extension 470.

As illustrated best in FIGS. 8 and 9, the upper tubular portion 465 of the straw assembly 407 includes a transverse passageway 446 that extends through the entire width of the upper tubular portion, a longitudinal passageway 448 in fluid communication with the transverse passageway, and an opening 445 in fluid communication with the longitudinal passageway for allowing liquid to exit or discharge the straw cup 401. In the illustrated embodiment, the transverse passageway 446 is open at both of its ends for allowing liquid to enter into the transverse passageway and thereby the longitudinal passageway. It is contemplated that in other suitable embodiments, the transverse passageway 446 can be open at only one of its ends.

In one suitable embodiment, the straw assembly 407 is manufactured from a suitably pliable material so that at least a portion of the straw assembly can be resiliently deformed and passed through the upward and downward extending elliptical sockets 440, 442 in the closure member 413. The straw assembly 407 is adapted to return to approximately its original shape after deformation to thereby mount the straw assembly to the closure member 413. More specifically, to mount the straw assembly 407 to the closure member 413 (or more broadly to the lid assembly 405), the upper tubular portion 465 is inserted through the downward extending elliptical socket 442 in the closure member 413 from the underside (or bottom) of the closure member until the upper mounting member 467 is disposed within and captured by at least the downward extending elliptical socket. The straw assembly 407 is seen mounted to the closure member 413 in FIGS. 10-12.

With the straw assembly 407 mounted on the closure member 413, the upper mounter member 467 engages and forms a seal with the downward extending elliptical socket 442 of the closure member, and the diaphragm 466 sealingly engages the interior socket 455 surrounding the elliptical socket 440 (FIGS. 10 and 11). More specifically and as seen in FIG. 11, the seal is defined by the vertical extending inner surface of the downward extending elliptical socket 442 and the vertical extending outer surface of the upper mounting member 467. Thus, the seal separating a suction chamber 511 from the liquid chamber of the container 403 is a vertical seal. In other words, the seal between the suction chamber 511 and the liquid chamber of the container 403 extends parallel to the longitudinal axis LA of the cup 401. The seal inhibits liquid within the liquid chamber of the container 403 from passing the valve assembly 480 and entering the suction chamber 511 under normal conditions (i.e., when a vacuum is not being applied by a user). The diaphragm 466 sealingly engages the interior socket 455 surrounding the downward extending elliptical socket 442 (FIGS. 10 and 11) to inhibit ambient air with a vent chamber 509 from entering into the liquid chamber of the container 403 under normal conditions. The diaphragm 466 also inhibits liquid within the container 403 from exiting the cup 401 through the vent opening. In addition, the straw assembly 407 includes an annular rib 468 spaced from and disposed above the upper mounter member 467. As illustrated in FIGS. 10-12, the annular rib 468 engages and forms a fluid-tight seal with the upward extending elliptical socket 440 of the closure member.

As illustrated in FIG. 8, the straw extension 470 can be readily coupled to the internal mounting member 469 via a friction fiction connection. The illustrated straw extension 470 has a generally elliptical cross-sectional shape but it is understood that the straw extension can have any suitable cross-section shape (e.g., circular).

In this embodiment, a valve assembly, indicated generally at 480 (FIGS. 7-12), is integrally formed with the straw assembly 407. More specifically, a recessed circular plug 481 is integrally formed within the upper mounting member 467 of the straw assembly 407 (FIGS. 7 and 8). In other words, the circular plug 481 is formed as a single piece with the straw assembly 407. The circular plug 481 of the valve assembly 480 includes an outer surface 495 and an inner surface 497. The outer surface 495 of the circular plug 481 is recessed relative to the other portions of the outer surface of the upper mounting member 467. Moreover, the circular plug 481 has a minimum thickness relative to the other portions of the upper mounting member 467. A circular opening 499 extends through the circular plug 481 from the outer surface 495 to the inner surface 497.

An annular surface 501, which is a portion of the inner surface 497 of the circular plug 481, circumscribes the circular opening 499 as best seen in FIG. 9. The annular surface 501 is adapted to form a seal with the straw extension 470 as illustrated in FIGS. 8-11 to thereby block the flow of fluid through the circular opening 499. The annular surface 501 when abutted against the straw extension 470 to form the seal, does not contribute to the surface area of the inner surface area 497 that internal pressure may act on to displace the circular plug 481. In the illustrated embodiment, the annular surface 501 of the inner surface 497 of the circular plug 481 is generally parallel to the correspondence or opposed portion of the outer surface 495 of the circular plug. The portions of the inner surface 497 surrounding the annular surface 501 are angled relative to the annular surface portion and, thus, are angled relative to the outer surface 495 of the circular plug 481. As a result, the total surface area of the inner surface 497 is greater than the total surface area of the outer surface 495. Further, the forces acting on the angled portions of the inner surface 497 are not directly perpendicular to the outer surface 495 of the circular plug 481. The inner surface 497 consequently does not allow the pressure forces to contribute substantially to the displacement of the circular plug 481. As a result, the area of the inner surface 497 is effectively smaller than the area of the outer surface 495.

It is easy for a young child (or any other user) to get a drink out of the cup 401 by placing her lips around the upper tubular portion 465 of the straw assembly 407 so as to form a seal with the straw assembly and sucking so that liquid in the container 403 is drawn up through the straw extension 470 and other parts of the straw assembly 407, and into the child's mouth. Sucking on the straw assembly 407 removes air therefrom and applies vacuum to the outer surface 495 of the circular plug 481. Upon a threshold vacuum being applied to the outer surface 495, the circular plug 481 flexes outward thereby moving the valve assembly 480 from a sealed, closed configuration (FIG. 11), which inhibits liquid from passing the valve assembly 480, to an unsealed, opened configuration, which allows liquid to pass the valve assembly (FIG. 12). More specifically, vacuum applied by the user to the circular plug 481 at or below (i.e., greater vacuum) the threshold vacuum causes at least a portion of the circular plug 481 to flex outward (e.g., in a direction generally parallel to a transverse axis of the cup 401). Once the circular plug 481 is flexed (or otherwise moved or deformed) a sufficient amount, a pathway is opened allowing liquid to pass the valve assembly 480 through the circular opening 499. Thus, the user applying vacuum to the straw assembly 407 at or above the threshold vacuum permits liquid to flow past the valve assembly 480 through the circular opening 499 and into the user's mouth for drinking.

In one suitable embodiment, the amount of vacuum pressure (applied by the user sucking on the upper tubular portion 465 of the straw assembly 407) needed to configure the valve assembly 480 from the sealed (or closed) configuration to its unsealed (or opened) configuration can be predetermined. Suitably, the amount of vacuum pressure needed to move the valve assembly 480 between the sealed and unsealed position is less than 5 inches of mercury. In one suitable embodiment, the amount of vacuum needed to move the valve assembly 480 between the sealed and unsealed position is between 2 inches of mercury and 5 inches of mercury. In the illustrated embodiment, for example, the amount of vacuum needed to move the valve assembly 480 between the sealed and unsealed position is about 3 inches of mercury.

Once the user stops applying a vacuum pressure to the straw assembly, the resiliency of the valve assembly 480 causes the valve assembly to move from the unsealed position back to the sealed position. More specifically, terminating the vacuum applied to the outer surface 495 of the circular plug 481 results in the circular plug 481 moving back towards its original, at rest position (shown in FIGS. 10 and 11). As the circular plug 481 moves back to its rest position, the pathway therethough closes thereby inhibiting liquid from passing the valve assembly 480. As a result, the annular surface 501, which extends inward from the inner surface 497 of the circular plug 481 and circumscribes the circular opening 499, is moved back into sealing engagement with the straw extension 470 as illustrated in FIG. 11. Thus, the user by stopping to apply vacuum at or above the threshold vacuum causes the valve assembly 480 to return to its closed, sealed position.

As liquid is drawn out of the container 403 by the child, the pressure within the liquid chamber 429 of the container is reduced. Upon reaching a threshold vacuum pressure within the liquid chamber 429 of the container 403, the diaphragm 466 of the straw assembly 407 moves away from interior socket 455 of the closure member 413 thereby allowing ambient air to pass through the aperture 441 in the closure member and into the liquid chamber of the container 403 to bring the pressure within the liquid chamber to or approximately to ambient (FIG. 12). Once the vacuum pressure within the liquid chamber 429 of the container 403 returns approximately to ambient, the diaphragm 466 of the straw assembly 407 moves back into a sealed position with the interior socket 455 of the closure member 413.

Figure 13:
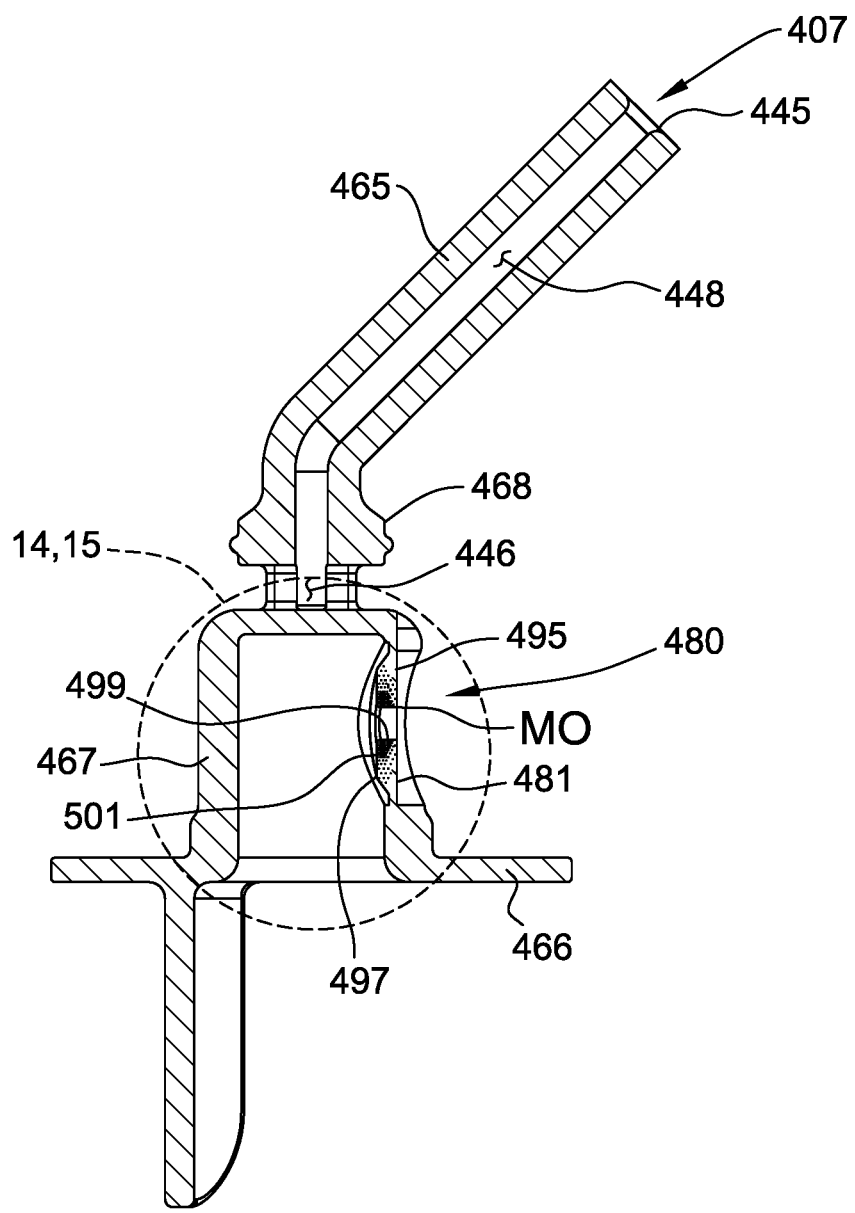
FIG. 13 is a vertical cross-section of the valve assembly showing the valve assembly being acted upon by a vacuum sufficient to move the valve assembly to the opened, unsealed configuration.
Figure 14:
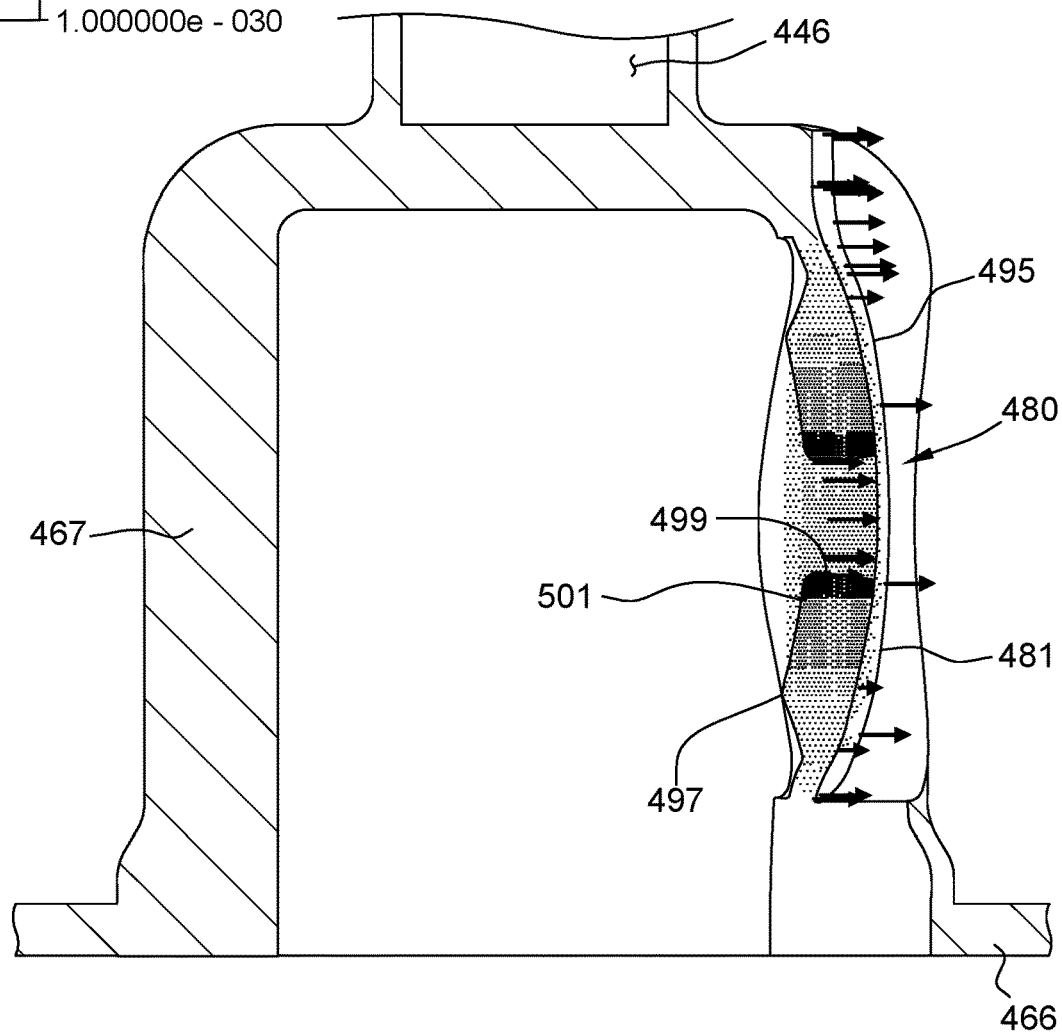
FIG. 14 is a fragmented, enlarged longitudinal cross-section of the valve assembly of FIG. 13 being acted upon by the vacuum.

FIGS. 13 and 14 are cross-sections of the valve assembly 480 in isolation without any other components of the cup 401 being seen. The valve assembly 480 is illustrated being acted on by vacuum pressure applied to the outer surface 495 of the circular plug 481 (e.g., when a user applies a vacuum to the straw assembly 407 to take a drink from the cup 401). As seen therein, the recessed circular plug 481 flexes outward away from the longitudinal axis LA of the cup 401 and thus away from the straw extension 470 (the straw extension not being seen in FIGS. 13 and 14). Direction arrows have been added to FIG. 14 to indicate the direction that the circular plug 481 flexes. As illustrated in FIGS. 13 and 14, the portions MO of the circular plug 481 adjacent the opening 499 therein flex the greatest extent. The extent or amount that the circular plug 481 flexes tapers or lessens in all radial direction away from the opening 499.

As mentioned above, the amount of vacuum (applied by the user sucking on the upper tubular portion 465 of the straw assembly 407) needed to move the valve assembly 480 between the sealed and unsealed position is less than 5 inches of mercury. In one suitable embodiment, the amount of vacuum needed to move the valve assembly 480 between the sealed and unsealed position is between 2 inches of mercury and 5 inches of mercury. In the illustrated embodiment, for example, the amount of vacuum needed to move the valve assembly 480 between the sealed and unsealed position is about 3 inches of mercury.

Stated another way, in one suitable embodiment, the amount of vacuum (applied by the user sucking on the upper tubular portion 465 of the straw assembly 407) needed to flex the outer surface 495 of the circular plug 481 of the valve assembly 480 away from the straw extension 470 is less than 5 inches of mercury. Suitably, the amount of vacuum needed to flex the outer surface 495 of the circular plug 481 between the sealed and unsealed position is between 2 inches of mercury and 5 inches of mercury. In the illustrated embodiment, for example, the amount of vacuum needed to flex the outer surface 495 of the circular plug 481 to the position illustrated in FIGS. 13 and 14 is about 3 inches of mercury.

Figure 15:
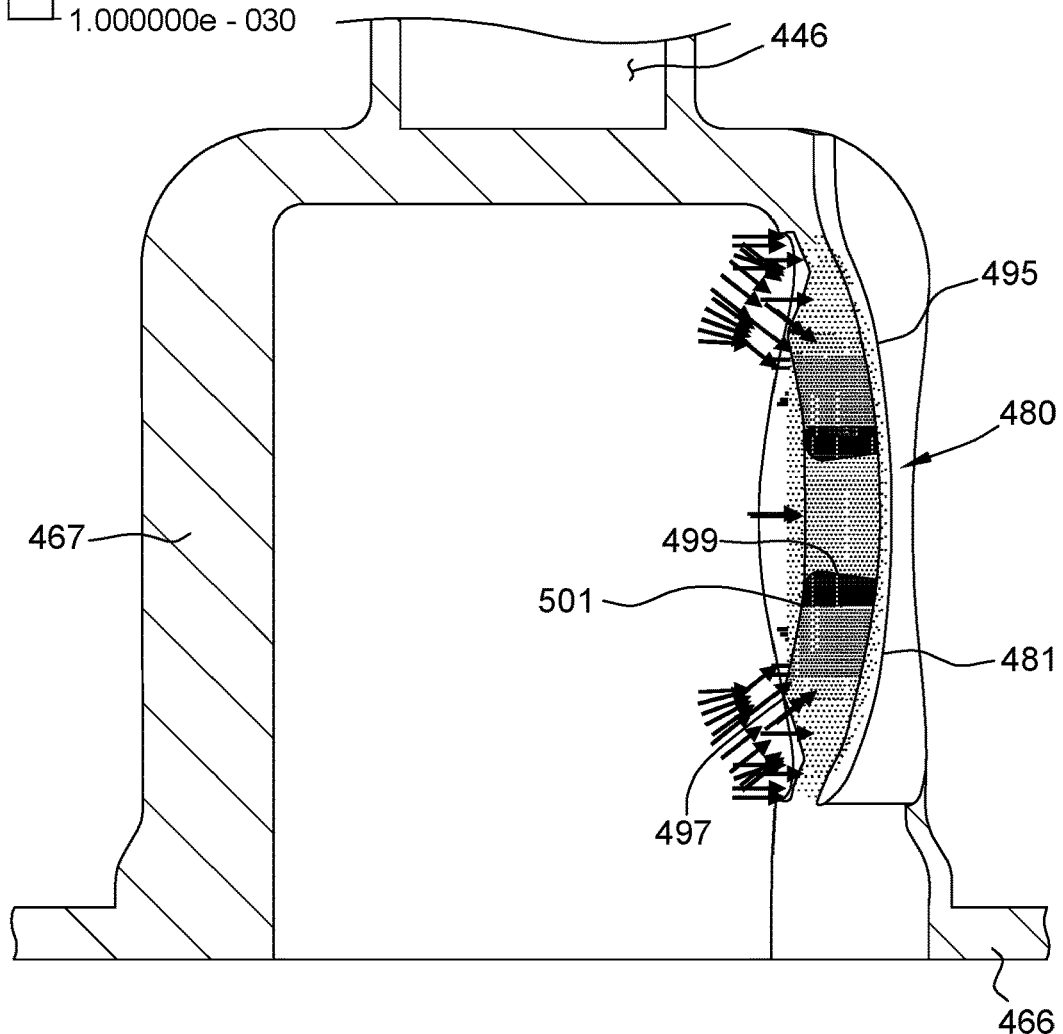
FIG. 15 is a fragmented, enlarged longitudinal cross-section of valve assembly similar to FIG. 14 but illustrating the valve being acted upon by pressure within the container.

FIG. 15 is an enlarged, fragmentary cross-section similar to FIG. 14 but illustrating the valve assembly 480 being acted upon by internal pressure (i.e., pressure within the liquid chamber 429 of the container 403). As indicated by arrows in FIG. 15, internal pressure within the container 403 acts on a portion of the inner surface 497 of the circular plug 481 excluding the annular surface portion 501. The annular surface portion 501 of the inner surface 497 of the circular plug 481 is shielded from the internal, positive pressure by the straw extension 470 (the straw extension is not illustrated in FIG. 15).

In the illustrated embodiment, the internal pressure within the container 403 needs to exceed 6 inches of mercury before the valve assembly 480 moves from the sealed position to the unsealed position. In other words, the valve assembly 480 resists opening at internal pressures at or below six inches of mercury. Thus, internal pressures at or below six inches of mercury do not cause the circular plug 481 of the valve assembly to flex outward. In one suitable embodiment, the valve assembly 480 resists opening (i.e., moving from the sealed position to the unsealed position) at internal pressures at or below 15 inches of mercury and, more preferably, at internal pressures at or below 8 inches of mercury.

Accordingly, the amount of vacuum acting on the outer surface 495 of the circular plug 481 of the valve assembly 480 needed to move the illustrated valve assembly from the sealed position to the unsealed position is substantially less than the amount of internal pressure acting on the inner surface 497 of the circular plug needed to move the illustrated valve assembly from the sealed position to the unsealed position. As seen in FIGS. 14 and 15, the amount (i.e., surface area) of the outer surface 495 of the circular plug 481 of the valve assembly 480 being acted on by the vacuum is greater than the amount (i.e., surface area) of the inner surface 497 of the circular plug being acted on by the internal pressure.

When introducing elements of the present invention or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above without departing from the scope of the invention, it is intended that all matter contained in the above description and shown in the accompanying drawings shall be interpreted as illustrative and not in a limiting sense.

What is claimed is:

1. A valve assembly for a leak resistance drinking cup, the valve assembly being selectively configurable between a sealed position and an unsealed position, the valve assembly comprising a plug having a first side, a second side opposite the first side, an inner surface extending from the first side to the second side, an outer surface extending from the first side to the second side, and an opening extending through the plug from the outer surface to the inner surface, the inner surface including an angled surface portion surrounding the opening, wherein the inner surface has an effectively smaller surface area than the outer surface, and wherein a total surface area of the inner surface is greater than a total surface area of the outer surface, an amount of vacuum acting on the outer surface of the plug needed to move the valve assembly from the sealed position to the unsealed position being of lesser magnitude than the amount of internal pressure acting on the inner surface of the plug needed to move the valve assembly from the sealed position to the unsealed position.

2. The valve assembly of claim 1 wherein the outer surface of the plug is recessed.

3. The valve assembly of claim 2 wherein the outer surface of the plug is circular.

4. The valve assembly of claim 1 wherein the inner surface of the plug is adapted to form a seal with a component of the leak resistant drinking cup in the sealed position.

5. The valve assembly of claim 1 wherein an amount of vacuum acting on the outer surface needed to move the valve assembly between the sealed and unsealed positions is less than 5 inches of mercury and an amount of positive pressure acting on the inner surface needed to move the valve assembly between the sealed and unsealed positions is greater than 6 inches of mercury.

6. The valve assembly of claim 5 wherein the amount of vacuum acting on the outer surface needed to move the valve assembly between the sealed and unsealed positions is less than 3 inches of mercury.

7. The valve assembly of claim 6 wherein the amount of positive pressure acting on the inner surface needed to move the valve assembly between the sealed and unsealed positions is greater than 8 inches of mercury.

8. The valve assembly of claim 7 wherein the amount of positive pressure acting on the inner surface needed to move the valve assembly between the sealed and unsealed positions is greater than 15 inches of mercury.

9. A valve assembly for a leak resistance drinking cup, the valve assembly being selectively configurable between a sealed position and an unsealed position, the valve assembly comprising a plug having an inner surface, an outer surface, and an opening extending through the plug from the outer surface to the inner surface, wherein the inner surface has an effectively smaller surface area than the outer surface, and wherein a total surface area of the inner surface is greater than a total surface area of the outer surface, an amount of vacuum needed to move the valve assembly between the sealed and unsealed positions being less than 5 inches of mercury, an amount of positive pressure needed to move the valve assembly between the sealed and unsealed positions being greater than 6 inches of mercury.

10. The valve assembly of claim 9 wherein the amount of vacuum needed to move the valve assembly between the sealed and unsealed positions is less than 3 inches of mercury.

11. The valve assembly of claim 9 wherein the amount of positive pressure needed to move the valve assembly between the sealed and unsealed positions is greater than 8 inches of mercury.

12. The valve assembly of claim 11 wherein the amount of positive pressure needed to move the valve assembly between the sealed and unsealed positions is greater than 15 inches of mercury.

13. The valve assembly of claim 10 wherein the inner surface of the plug includes an angled surface portion and an annular surface portion circumscribing the opening, the annular surface portion being adapted to form a seal with a component of the leak resistant drinking cup in the sealed position.

14. A valve assembly for a leak resistant drinking cup, the valve assembly comprising a plug having an inner surface, an outer surface, and an opening extending through the plug from the outer surface to the inner surface, the inner surface of the plug including an angled surface portion and an annular surface portion circumscribing the opening, the annular surface portion being adapted to form a seal with a component of the leak resistant drinking cup, the total surface area of the inner surface being greater than the total surface area of the outer surface, the total surface area of the outer surface being greater than the surface area of the angled surface portion of the inner surface.

15. The valve assembly of claim 14 wherein an amount of vacuum acting on the outer surface of the plug needed to move the valve assembly from a sealed position to an unsealed position is less than the amount of internal pressure acting on the inner surface of the plug needed to move the valve assembly from the sealed position to the unsealed position.

16. The valve assembly of claim 15 wherein an amount of vacuum acting on the outer surface needed to move the valve assembly between the sealed and unsealed positions is less than 5 inches of mercury and an amount of positive pressure acting on the inner surface needed to move the valve assembly between the sealed and unsealed positions is greater than 6 inches of mercury.

17. The valve assembly of claim 16 wherein the amount of vacuum acting on the outer surface needed to move the valve assembly between the sealed and unsealed positions is less than 3 inches of mercury.

18. The valve assembly of claim 17 wherein the amount of positive pressure acting on the inner surface needed to move the valve assembly between the sealed and unsealed positions is greater than 8 inches of mercury.

* * * * *